(12) United States Patent
Zhou et al.

(10) Patent No.: US 8,077,375 B2
(45) Date of Patent: Dec. 13, 2011

(54) METHOD AND APPARATUS FOR GENERATING 8-QAM-MODULATED OPTICAL SIGNAL

(75) Inventors: Xiang Zhou, Holmdel, NJ (US); Peter Magill, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/616,174

(22) Filed: Nov. 11, 2009

(65) Prior Publication Data

US 2011/0109954 A1    May 12, 2011

(51) Int. Cl.
*G02F 1/01* (2006.01)
*G02F 1/035* (2006.01)
*G02B 26/00* (2006.01)

(52) U.S. Cl. ............................. 359/279; 359/238; 385/3

(58) Field of Classification Search .......... 359/278–279, 359/315, 245, 247, 251–252, 254, 108, 237–238, 359/290–292, 298, 300–302; 385/1–3, 40, 129–132, 5, 8–9
See application file for complete search history.

(56) References Cited

U.S. PATENT DOCUMENTS

| | | | | |
|---|---|---|---|---|
| 7,817,923 B2 * | 10/2010 | Akiyama et al. | ............... | 398/188 |
| 2006/0263098 A1 * | 11/2006 | Akiyama et al. | ............... | 398/188 |
| 2009/0185810 A1 * | 7/2009 | Kaplan et al. | ................. | 398/184 |
| 2009/0324253 A1 * | 12/2009 | Winzer | ......................... | 398/185 |
| 2010/0329680 A1 * | 12/2010 | Presi et al. | ...................... | 398/79 |

* cited by examiner

*Primary Examiner* — Dawayne Pinkney (57) ABSTRACT

A system and method for producing an 8-QAM-modulated signal are disclosed. The methodology, in an exemplary expedient, generally comprises splitting light from a CW laser into two parts; modulating the first part with a first signal and modulating the second part with a second signal; phase shifting the modulated second part by about π/4; combining the modulated first part with the phase shifted and modulated second part to produce a four-level modulated signal; and phase modulating the four-level modulated signal with a third signal with a phase modulation of (0, π/2). Several variations of this method are described herein.

24 Claims, 8 Drawing Sheets

METHOD AND APPARATUS FOR GENERATING 8-QAM-MODULATED OPTICAL SIGNAL

FIELD OF THE DISCLOSURE

The present disclosure relates generally to communication networks, and more particularly, to methods and apparatus for directly converting a plurality of binary electrical signals into a single eight-level quadrature-amplitude-modulated (8-QAM) optical signal.

BACKGROUND

Wave division multiplexing (WDM) optical networks are well known. A WDM channel is typically transmitted by a single mode semiconductor laser, where information to be communicated is imposed on the light by modulating the laser current or by externally modulating the light by applying a voltage to a modulator coupled to the laser source. A receiver subsequently photo-detects and converts the light into electric current either by direct or coherent detection.

Due to the rapid growth of optical networks and the need for greater capacity, significant research has focused on finding efficient multi-level optical modulation formats. Any digital modulation scheme uses a finite number of distinct signals to represent digital data. Phase-shift-keying (PSK) uses a finite number of phases, each assigned a unique pattern of binary bits. Usually, each phase encodes an equal number of bits, and each pattern of bits forms the symbol that is represented by the particular phase. The demodulator, which is designed specifically for the symbol-set used by the modulator, determines the phase of the received signal and maps it back to the symbol it represents, thereby recovering the original data. The receiver compares the phase of the received signal to a reference signal. This expedient utilizes coherent detection and is referred to as CPSK.

Alternatively, in lieu of using the bit patterns to establish the phase of the wave, CPSK employs differential phase changes. The demodulator then determines these phase changes in lieu of the actual phase of the signal. This scheme is referred to as differential phase-shift keying (DPSK), and is easier to implement than PSK as there is no need for the demodulator to maintain the reference signal to determine the exact phase of the received signal.

BPSK (also sometimes called PRK, Phase Reversal Keying) is the simplest form of PSK. It utilizes a pair of phases separated by 180° and is known as 2-PSK.

Quaternary or quadriphase PSK, 4-PSK, or 4-QAM (QPSK) uses four points on a constellation diagram as is known in the art. The four-phase QPSK can encode two bits per symbol—twice the rate of BPSK—and experimentation has demonstrated that this may double the data rate compared to a BPSK system while maintaining the bandwidth of the signal. Alternatively, QPSK can maintain the data-rate of BPSK at half the requisite bandwidth.

Optical modulations based on four-level quadrature-phase-shift-key (QPSK) have been effectively demonstrated for both 40 Gb/s and 100 Gb/s optical transmission. In the quest for even higher spectral efficiency, eight-level 8-PSK modulation has been proposed and demonstrated experimentally.

8-QAM is another eight-level modulation format. In comparison to 8-PSK, 8-QAM is tolerant of greater noise (on the order of 1.6 dB), with identical spectral utilization.

Figure 1:
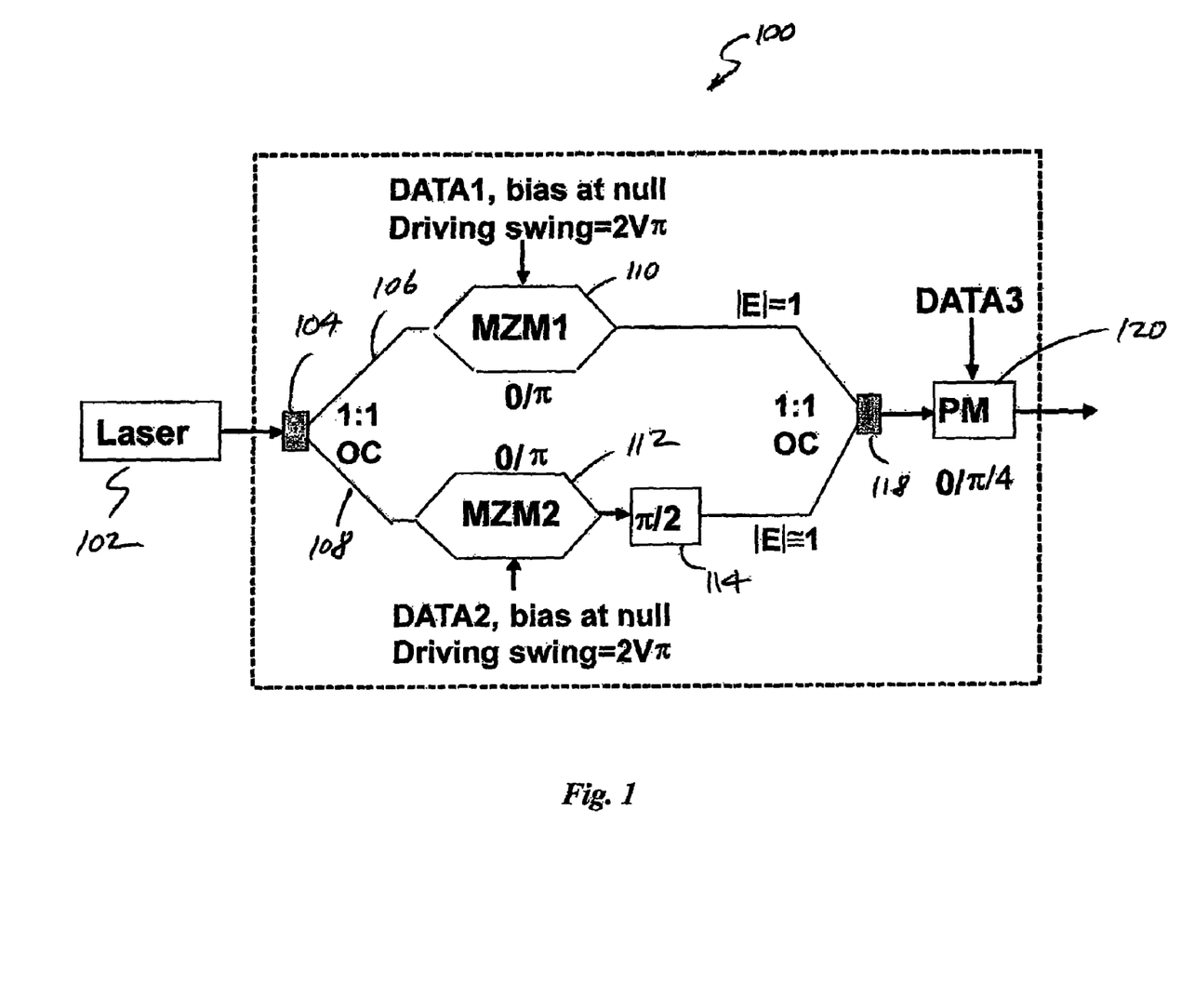
FIG. 1 is a schematic of a device for producing an 8-PSK-modulated signal.

FIG. 1 is a schematic of an 8-PSK modulator 100, which comprises an optical splitter 104 that splits the incoming light from a CW laser source 102 into two components—a first part 106 and a second part 108. The first and second parts 106, 108 are modulated by Mach-Zehnder Modulators MZM1 110 and MZM2 112, which are driven by binary signals DATA1 and DATA2, respectively, and biased at the null point with a driving swing of $2V\pi$. The modulated lower part from MZM2 112 is applied to a phase shifter 114 to impose a phase shift of $\pi/2$. The modulated first part 106 and modulated and phase-shifted lower part are combined by a 1:1 optical combiner 118 and the output thereof subsequently phase-modulated by $(0, \pi/4)$ with binary signal DATA3 at phase-modulator 120 to produce the 8-PSK signal.

8-QAM encodes the signal in both amplitude and phase, thus making 8-QAM more difficult to practically implement than 8-PSK.

SUMMARY

In accordance with a first aspect, an apparatus for producing an 8-QAM-modulated signal is disclosed herein. The apparatus comprises a first coupler that receives light from a CW laser and splits the light into two parts; a first modulator that receives and modulates the first part with a first signal and a second modulator that receives and modulates the second part with a second signal; a phase shifter coupled to the second modulator that shifts a phase of the modulated second part by approximately $\pi/4$; a second coupler that combines the modulated first part with the phase-shifted and modulated second part to produce a four-level modulated signal; and a phase modulator that receives the four-level modulated signal and further modulates the four-level modulated signal with a third signal with a phase modulation of $(0, \pi/2)$. The first and second modulators are preferably phase-asymmetric Mach-Zehnder (MZ) modulators.

In accordance with another aspect, an apparatus for producing an 8-QAM-modulated signal comprises: a phase modulator that receives light from a CW laser and modulates the light with a first signal with a phase modulation of $(0, \pi/2)$; a first coupler that receives the modulated light and splits the modulated light into two parts; a first modulator that modulates the first part with a second signal and a second modulator that modulates the second part with a third signal; a phase shifter that shifts a phase of the modulated second part by about $\pi/4$ (it will be appreciated by those skilled in the art that $\pi/4$ is an optimal setting for a MZM modulator with a very high extinction ratio, but for a practical MZM modulator with a moderate extinction ratio, the optimal phase shift may vary slightly); and a second coupler that combines the modulated first part with the phase shifted and modulated second part to produce an 8-QAM-modulated signal.

In accordance with yet another aspect, a method for producing an 8-QAM-modulated signal, comprises: splitting light into two parts; modulating the first part with a first signal and modulating the second part with a second signal; phase shifting the modulated second part by approximately $\pi/4$; combining the modulated first part with the phase shifted and modulated second part to produce a four-level modulated signal; and phase modulating the four-level modulated signal with a third signal with a phase modulation of $(0, \pi/2)$.

In accordance with still another aspect, a method for producing an 8-QAM-modulated signal, comprises: a phase modulator that receives light and modulates the light with a first signal; phase modulating light with a first signal with a phase modulation of $(0, \pi/2)$; splitting the phase modulated light into two parts; modulating the first part with a first signal and modulating the second part with a second signal; phase shifting the modulated second part by about π/4 and combining the modulated first part with the phase shifted and modulated second part.

These aspects of the invention and further aspects and advantages thereof will become apparent to those skilled in the art as the present invention is described with particular reference to the accompanying drawings.

DETAILED DESCRIPTION

Embodiments will be described with reference to the accompanying drawing figures wherein like numbers represent like elements throughout to the extent possible. Before embodiments are explained in detail, it is to be understood that the disclosure is not limited in its application to the details of the examples set forth in the following description or illustrated in the figures. The disclosure suggests other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 2:
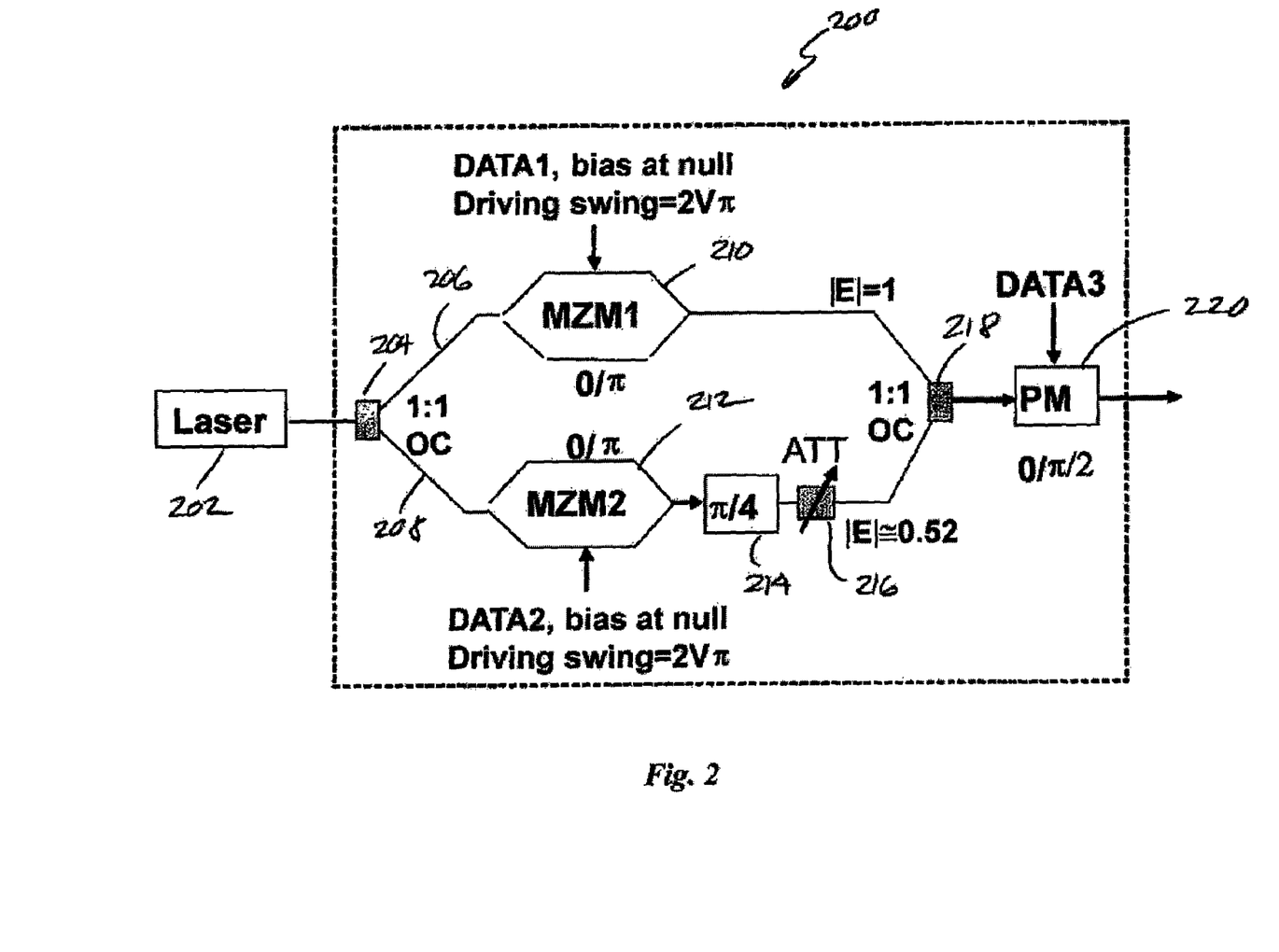
FIG. 2 is a schematic of an apparatus for producing an 8-QAM-modulated signal in accordance with an exemplary embodiment of the disclosure.

FIG. 2 is a schematic of a first exemplary embodiment of an apparatus 200 for converting three binary electrical signals into a single 8-QAM-modulated optical signal. In this regard, light generated by a constant wave (CW) laser source 202 is received by a first 3 dB 1:1 optical coupler 204 that equally splits the laser light into a first (upper) part 206 and a second (lower) part 208. The upper part 206 is applied to a first modulator 210, which is biased at the null point and driven by a first binary electrical signal (DATA1) with a driving swing voltage of 2 Vπ. Similarly, the lower part 208 is applied to a second modulator 212, which is biased at the null point and driven by the second binary electrical signal (DATA2) with a driving swing voltage of 2 Vπ.

Preferably, first and second modulators 210, 212 are phase-asymmetric Mach-Zehnder (MZ) modulators (hereinafter referred to as "MZM1 210" and "MZM2 212"), each of which utilizes an optical interferometer fabricated from a nonlinear material in which the velocity of light is varied by an applied electrical field to selectively block or transmit incident laser light as a function of the externally applied driving voltage. The driving swing voltage is either applied to a single input or applied differentially at a pair of inputs. The MZ modulators operate at the full serial data rate of the optical channel and the output of the modulator driver typically has the largest amplitude and highest bandwidth of any electrical signal in the system. As will be appreciated by those skilled in the art, MZ modulators are typically designed to minimize variations or imperfections in the amplified electrical waveform directly to the optical signal to effectively reduce distortion that can affect bit-error rate (BER) and consequent operating distance of the fiber link. The illustrative embodiments herein utilize dual-parallel MZMs; however the invention is not limited to these expedients.

Figure 3A:
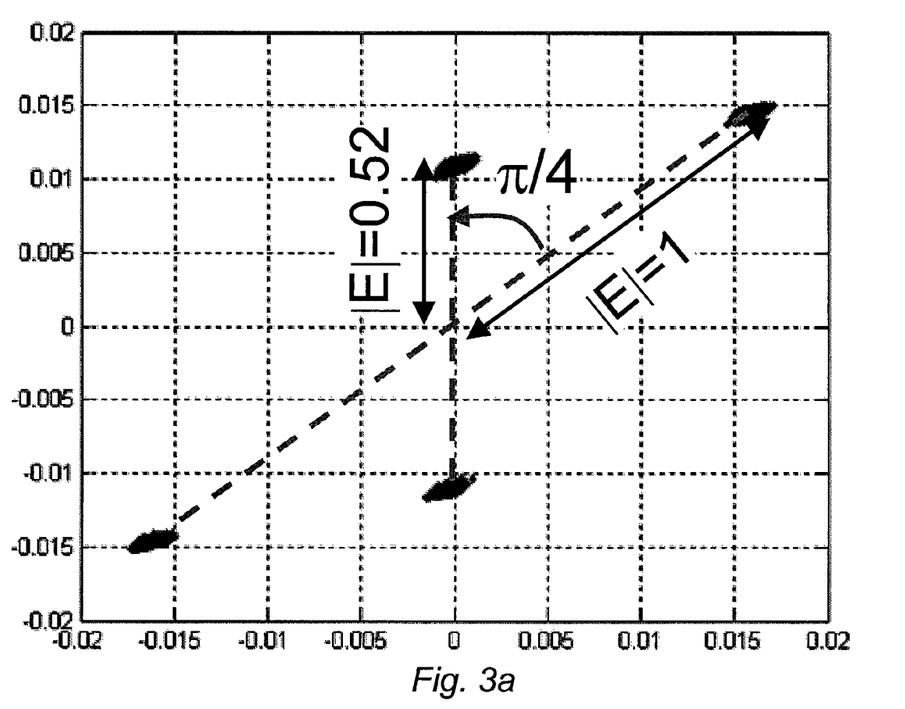
FIG. 3a is a simulated I-Q constellation diagram of the signal after amplitude and phase-asymmetric modulation.
Figure 3B:
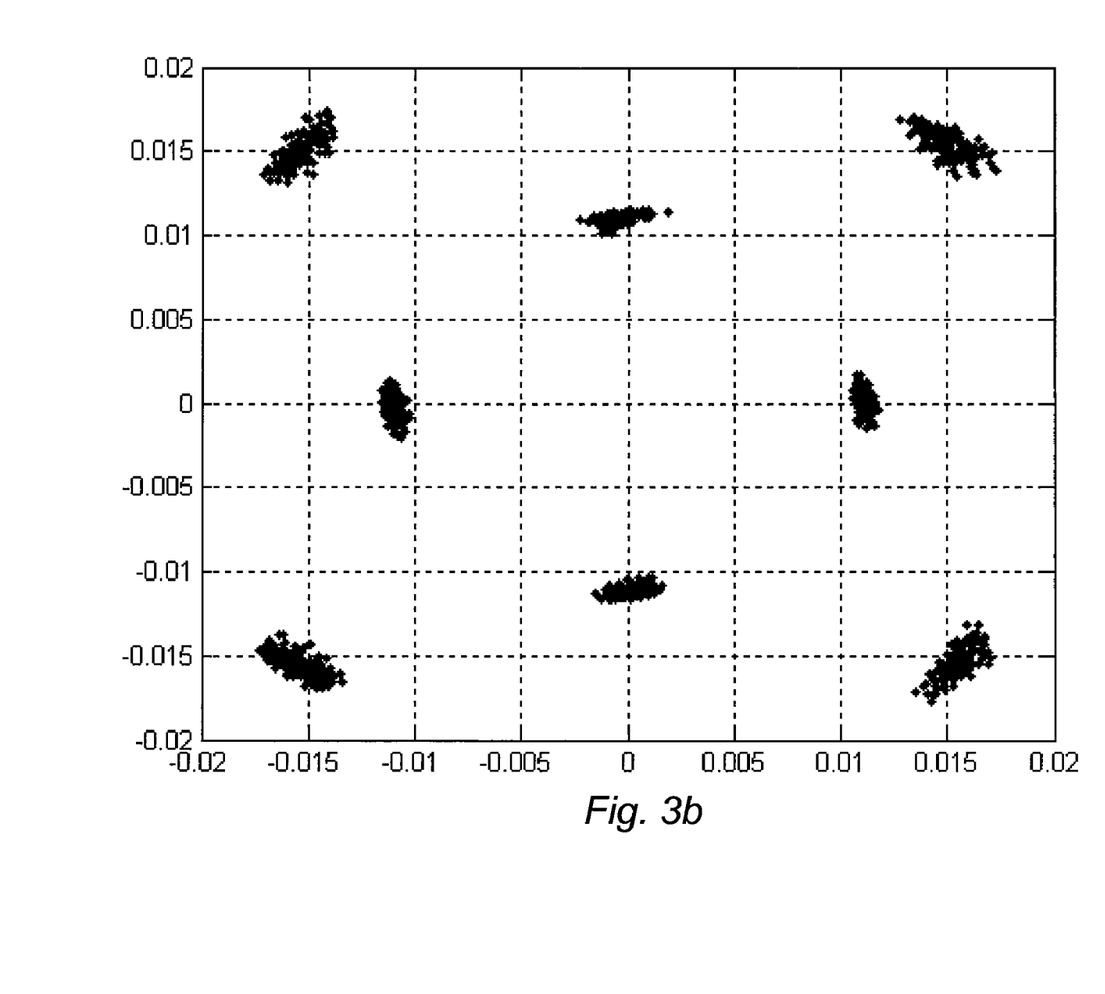
FIG. 3b is a simulated I-Q constellation diagram of the signal after π/2 phase modulation.

MZM1 210 and MZM2 212 are effectively operable as zero-chirp 0/π phase modulators. As illustrated in FIG. 2, the lower part 208 is phase modulated (0, π) by MZM2 212, then applied to a phase shifter 214 to impose a phase shift of π/4, and thereafter passed to a 5.7 dB power attenuator 216. The modulated, phase-shifted and attenuated lower part is subsequently input to a second 3 dB optical coupler 218 that combines the lower part 208 with the modulated upper part 206 from MZM1 210. The combined signal from optical coupler 218 is a four-level QAM signal 220, which is represented in FIG. 3(a) as a simulated I-Q constellation diagram using 19 Gb/s electrical binary signals and an 18 GHz 3-dB optical modulation bandwidth. The four-level modulated optical signal 220 is subsequently modulated by a phase modulator 222 driven by a third binary electrical signal (DATA3) with a phase modulation of (0, π/2). Advantageously, the output of phase modulator 222 is an optimal circular eight-level 8-QAM-modulated optical signal—represented in the I-Q constellation diagram of FIG. 3(b).

Figure 4:
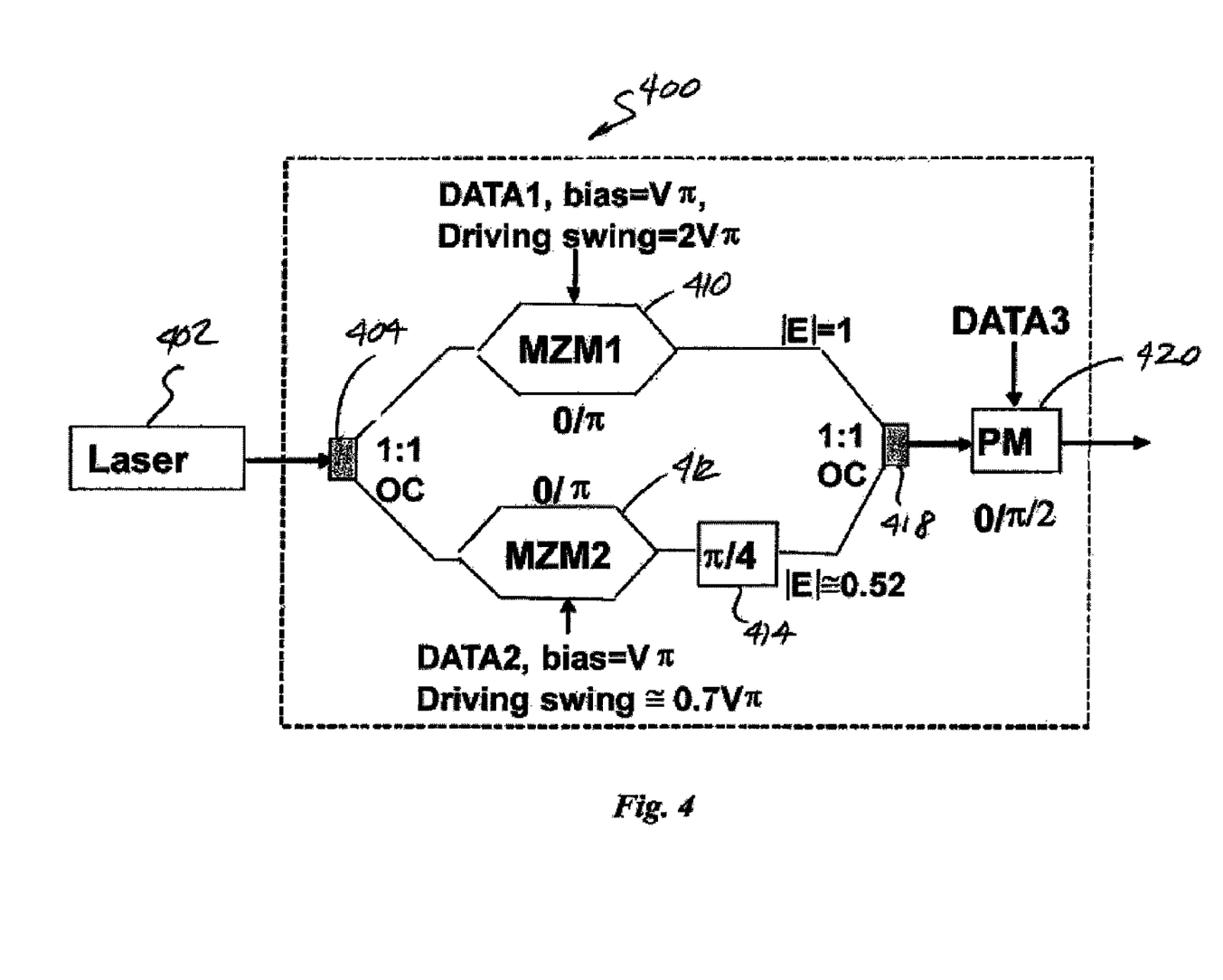
FIG. 4 is a schematic of an apparatus for producing an 8-QAM-modulated signal in accordance with an exemplary embodiment of the disclosure.

FIG. 4 is a schematic of a second exemplary embodiment 400 for achieving 5.7 dB power attenuation by reducing the driving swing of MZM2 from 2 Vπ to 0.7 Vπ. In this embodiment, all components of the apparatus are similar to the expedient described above and illustrated in FIG. 4. As in the first exemplary embodiment of FIG. 4, light generated by a CW laser source 402 is received by a first 3 dB 1:1 optical coupler 404 that splits the light into an upper part 406 and a lower part 408. The upper part 406 is applied to MZM1 410, which is biased at the null point and driven by a first binary electrical signal (DATA1) with a driving swing voltage of 2 Vπ. Similarly, the lower part 408 is applied to MZM2 212, which is biased at the null point and driven by the second binary electrical signal (DATA2) with, in this embodiment, a driving swing voltage of 0.7 Vπ. The lower part 408 is thereafter phase modulated (0, π) by MZM2 412, applied to a π/4 phase shifter 414, and then input to a second 3 dB optical coupler 418 that combines the lower part 408 with the modulated upper part 406 from MZM1 410. The four-level modulated optical signal 420 from coupler 418 is thereafter modulated by a phase modulator 422 driven by a third binary electrical signal (DATA3) with a phase modulation of (0, π/2) to produce the 8-QAM-modulated optical signal.

Figure 5:
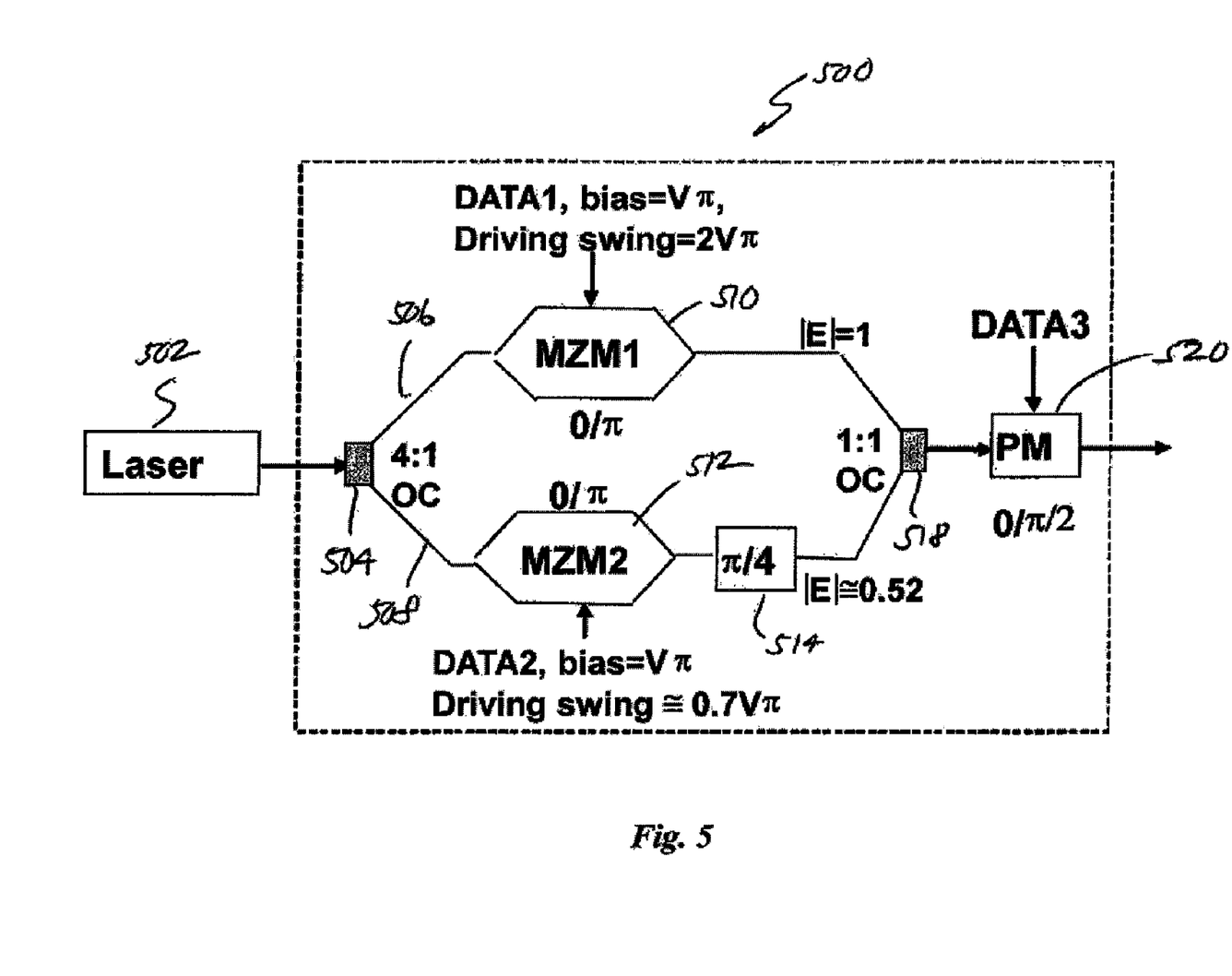
FIG. 5 is a schematic of an apparatus for producing an 8-QAM-modulated signal in accordance with an exemplary embodiment of the disclosure.

FIG. 5 is a schematic of a third exemplary embodiment 500 that advantageously achieves the desired power attenuation by substituting a 4:1 optical coupler 504 in lieu of the 3 dB optical coupler 204/404 shown in FIGS. 2 and 4. Thus, all components are similar to the expedients described above and illustrated in FIGS. 2 and 4. Light from a CW laser source 502 is received by a 4:1 optical coupler 504 that splits the light into an upper part 506 and a lower part 508. The upper part 506 is applied to MZM1 510, which is biased at the null point and driven by a first binary electrical signal (DATA1) with a driving swing voltage of 2 Vπ. Similarly, the lower part 508 is applied to MZM2 512, which is biased at the null point and driven by the second binary electrical signal (DATA2) with a driving swing voltage of 2 Vπ. The lower part 508 is phase modulated (0, π) by MZM2 512, applied to a π/4 phase shifter 514, and thereafter input to a second 3 dB optical coupler 518 that combines the lower part 508 with the modulated upper part 506 from MZM1 510. The four-level modulated optical signal 520 from coupler 518 is thereafter modulated by a phase modulator 522 driven by a third binary electrical signal (DATA3) with a phase modulation of (0, π/2) to produce the 8-QAM-modulated optical signal.

Figure 6:
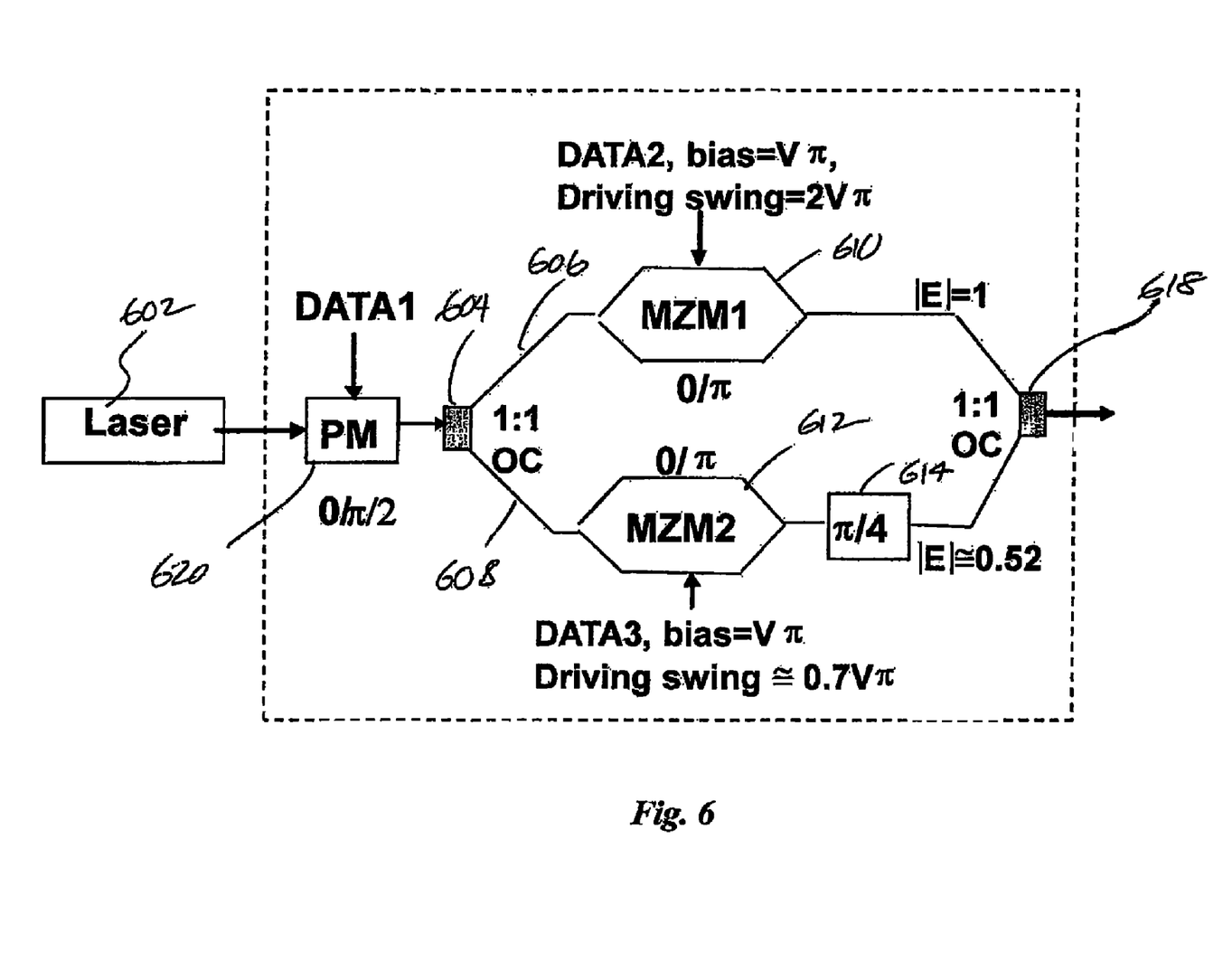
FIG. 6 is a schematic of an apparatus for producing an 8-QAM-modulated signal in accordance with another exemplary embodiment of the disclosure.

FIG. 6 is a schematic of a fourth illustrative embodiment 600 that introduces the phase modulation (0, π/2) prior to dividing the light into constituent upper and lower parts. In this regard, the apparatus 600 comprises a phase modulator 620 that receives light from CW laser 602 and modulates the light with a first binary electrical signal (DATA 1) with a phase modulation (0, π/2). The phase-modulated light is received by a first coupler 604 that splits the modulated light into an upper part 606 and lower part 608. The upper part 606 is applied to a first modulator 610, which is biased at the null point and driven by a first binary electrical signal (DATA2) with a driving swing voltage of 2 Vπ. Similarly, the lower part 608 is applied to a second modulator 612, which is biased at the null point and driven by the second binary electrical signal (DATA2) with a driving swing voltage of 2 Vπ. As in the exemplary embodiment of FIG. 2, the lower part 608 is phase modulated (0, π) by MZM2 612, applied to a π/4 phase shifter 614, and thereafter passed to a 5.7 dB power attenuator 616 (not shown in the FIG. 6, I have attached a document showing the corrected FIG. 6). The modulated, phase-shifted and power-attenuated lower part is then input to a second 3 dB optical coupler 618 that combines the lower part 608 with the modulated upper part 606 from MZM1 610. It will be appreciated by those skilled in the art that this modification may be incorporated in the embodiments of FIGS. 4 and 5.

Figure 7:
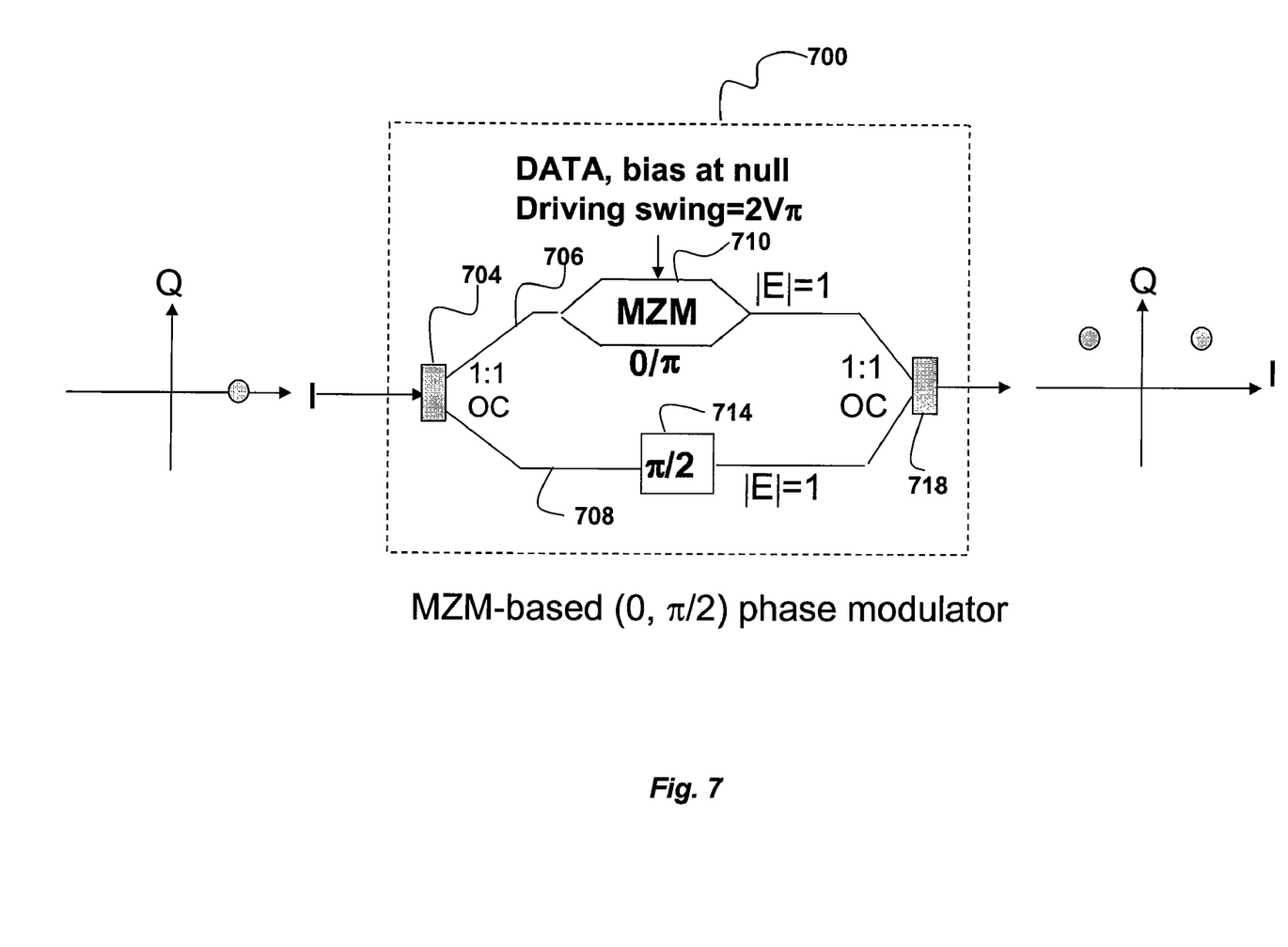
FIG. 7 is a schematic of an apparatus for producing an 8-QAM-modulated signal in accordance with yet another exemplary embodiment of the disclosure.

In the above we have assumed that the (0,π/2) phase modulation is achieved by using the common phase modulator, where the phase modulation is linearly proportional to the applying driving electrical voltage. However, such a phase modulator will linearly transfer the amplitude jitter of the driving electrical signal into the phase jitter of the modulated optical signal and therefore may degrade the performance of the generated optical signal. In FIG. 7 we disclose a new MZM-based (0,π/2) phase modulator, where the (0, π/2) phase modulation is achieved by interfering one (0,π) MZM-modulated light with a π/2 phase-shifted CW light. Due to the nonlinear electrical-to-optical response of MZM modulator, the proposed new (0,π/2) phase modulator can effectively suppress electrical-to-optical jitter transfer.

FIG. 7 is a schematic of another exemplary apparatus that is operable as a chirp-less (0, π/2) phase modulator 700. In this expedient, the light from a CW laser is split by a first coupler 704 into an upper part 706 and lower part 708. The upper part 706 is applied to a modulator 710, which is biased at the null point and driven by a binary electrical signal (DATA) with a driving swing voltage of 2 Vπ. The lower part 708 is applied to a π/2 phase shifter 714, and thereafter input to a second 3 dB optical coupler 718 that combines the lower part 708 with the modulated upper part 706 from MZM1 710 to produce the 8-QAM-modulated optical signal.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. An apparatus, comprising:
   a first coupler that receives light and splits the light into a first part and a second part;
   a first modulator that modulates the first part with a first signal to produce a modulated first part and a second modulator that modulates the second part with a second signal to produce a modulated second part;
   a phase shifter that shifts a phase of the modulated second part by π/4 to produce a phase shifted modulated second part;
   a second coupler that combines the modulated first part with the phase shifted modulated second part to produce a four-level modulated signal; and
   a phase modulator that further modulates the four-level modulated signal with a third signal with a phase modulation of (0, π/2) to produce an 8-quadrature amplitude modulation signal.

2. The apparatus according to claim 1, wherein the first modulator and the second modulator each comprises a Mach-Zehnder optical modulator.

3. The apparatus according to claim 1, wherein the first coupler and the second coupler each comprises a 3 dB (1:1) optical coupler.

4. The apparatus according to claim 1, wherein the first modulator is biased at a null point and driven by the first signal with a driving swing of 2 Vπ, and the second modulator is biased at a null point and driven by the second signal with a driving swing equal to 2 Vπ.

5. The apparatus according to claim 1, wherein the phase modulator is driven by the third signal with a phase modulation equal to (0, π/2).

6. The apparatus according to claim 1, wherein the first signal, the second signal, and the third signal are binary electrical signals.

7. The apparatus according to claim 1, wherein the first modulator is biased at a null point and driven by the first signal with a driving swing of 2 Vπ, and the second modulator is biased at a null point and driven by the second signal with a driving swing equal to 0.7 Vπ.

8. The apparatus according to claim 1, wherein the first coupler is a 4:1 optical coupler.

9. The apparatus according to claim 1, further comprising an attenuator that attenuates the phase shifted modulated second part.

10. The apparatus according to claim 9, wherein the attenuator attenuates the phase-shifted modulated second part by approximately 5.7 dB.

11. An apparatus, comprising:
   a phase modulator that receives light and modulates the light with a first signal with a phase modulation of (0, π/2) to produce a modulated light;
   a first coupler that receives the modulated light and splits the modulated light into a first part and a second part;
   a first modulator that modulates the first part with a second signal to produce a modulated first part and a second modulator that modulates the second part with a third signal to produce a modulated second part;
   a phase shifter that shifts a phase of the modulated second part by π/4 to produce a phase shifted modulated second part; and a second coupler that combines the modulated first part with the phase shifted modulated second part to produce an 8-quadrature amplitude modulation signal.

12. The apparatus according to claim 11, wherein the first modulator and the second modulator each comprises a Mach-Zehnder optical modulator.

13. The apparatus according to claim 11, wherein the first coupler and the second coupler each comprises a 3 dB (1:1) optical coupler.

14. The apparatus according to claim 11, wherein the first modulator is biased at a null point and driven by the second signal with a driving swing of 2 $V\pi$, and the second modulator is biased at a null point and driven by the third signal with a driving swing equal to 2 $V\pi$.

15. The apparatus according to claim 11, wherein the first signal, the second signal, and the third signal are binary electrical signals.

16. The apparatus according to claim 11, wherein the first modulator is biased at a null point and driven by the second signal with a driving swing of 2 $V\pi$, and the second modulator is biased at a null point and driven by the third signal with a driving swing equal to 0.7 $V\pi$.

17. The apparatus according to claim 11, wherein the first coupler is a 4:1 optical coupler.

18. The apparatus according to claim 11, further comprising an attenuator that attenuates the phase shifted and modulated second part.

19. The apparatus according to claim 18, wherein the attenuator attenuates the phase shifted modulated second part by approximately 5.7 dB.

20. A method for producing an 8-quadrature amplitude modulation signal, comprising:
   splitting light into a first part and a second part;
   modulating the first part with a first signal to produce a modulated first part and modulating the second part with a second signal to produce a modulated second part;
   phase shifting the modulated second part by $\pi/4$ to produce a phase shifted modulated second part;
   combining the modulated first part with the phase shifted modulated second part to produce a four-level modulated signal; and
   phase modulating the four-level modulated signal with a third signal with a phase modulation of $(0, \pi/2)$.

21. The method according to claim 20, further comprising attenuating the phase shifted modulated second part.

22. The method according to claim 20, further comprising biasing a first modulator at a null point and driving the first modulator by the first signal at a driving swing of 2 $V\pi$, and biasing a second modulator at a null point and driving the second modulator by the second signal with a driving swing equal to 2 $V\pi$.

23. The method according to claim 20, further comprising biasing a first modulator at a null point and driving the first modulator by the first signal at a driving swing of 2 $V\pi$, and biasing a second modulator at a null point and driving the second modulator by the second signal with a driving swing equal to 0.7 $V\pi$.

24. A method for producing an 8-quadrature amplitude modulation signal, comprising:
   phase modulating light with a first signal with a phase modulation of $(0, \pi/2)$ to produce the phase modulated light;
   splitting the phase modulated light into a first part and a second part;
   modulating the first part with a second signal to produce a modulated first part and modulating the second part with a third signal to produce a modulated second part;
   phase shifting the modulated second part by $\pi/4$ to produce a phase shifted modulated second part; and
   combining the modulated first part with the phase shifted modulated second part.

* * * * *